Feb. 19, 1957 R. E. WILLIAMS ET AL 2,782,048
GOLF BAG CART
Filed Sept. 22, 1952 2 Sheets-Sheet 1
Fig. 1
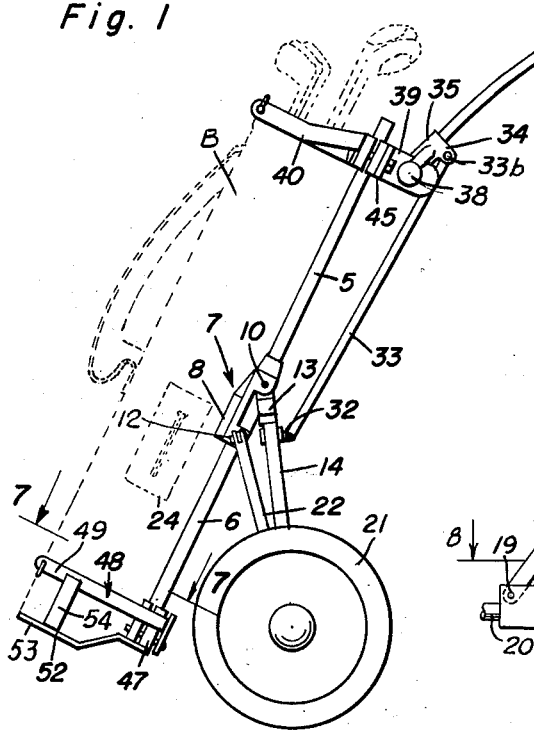
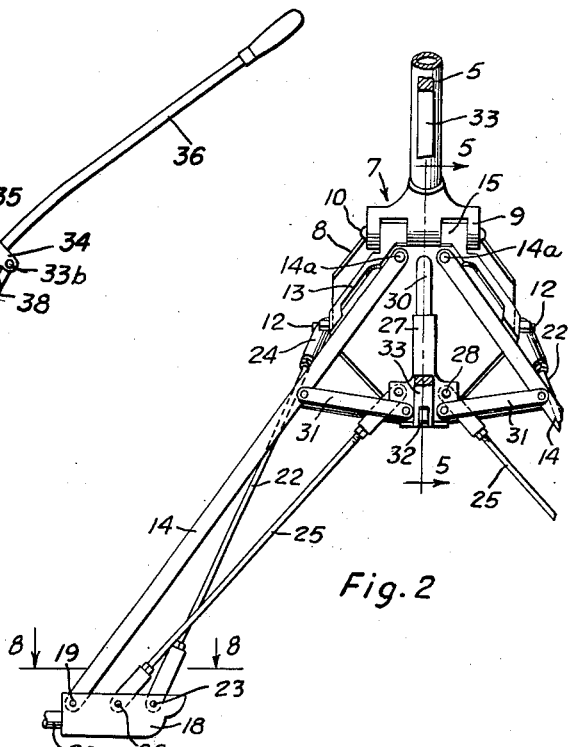
Fig. 2
Fig. 3
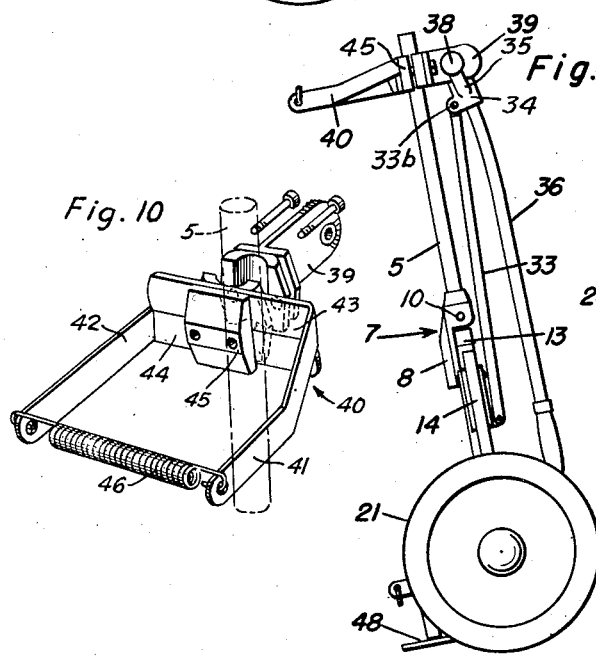
Fig. 10
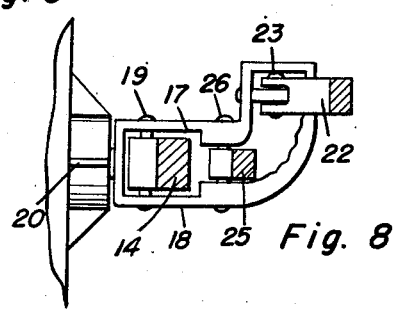
Fig. 8
Robert E. Williams
Ellsworth C. Engel
INVENTORS
BY Clarence A. O'Brien
and Harvey B. Jackson
Attorneys

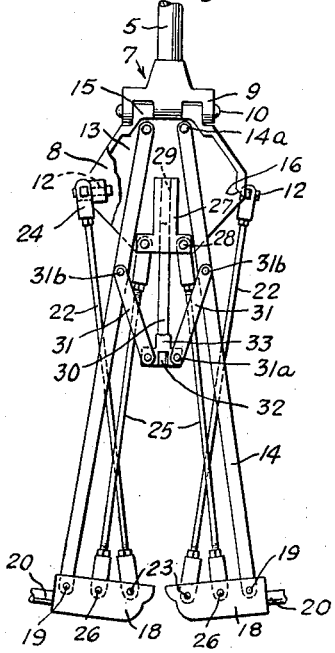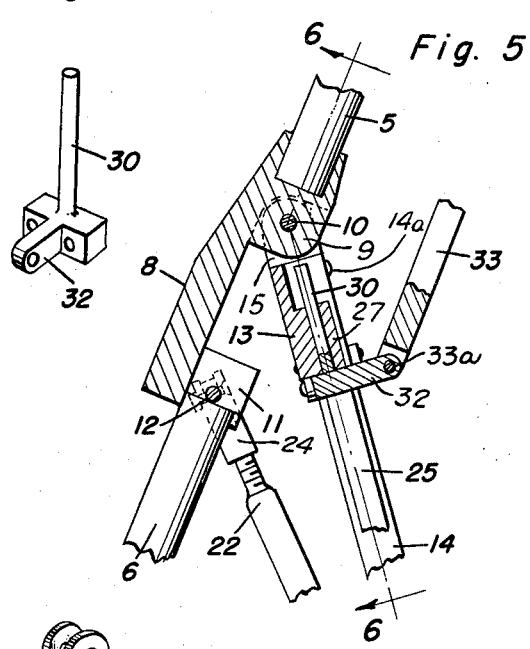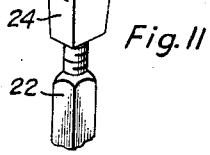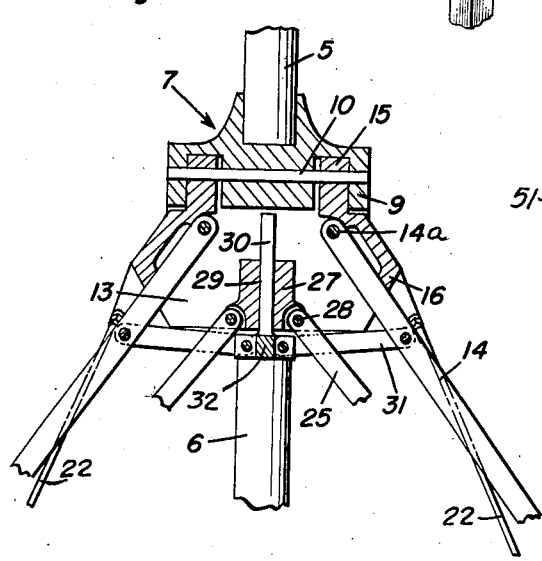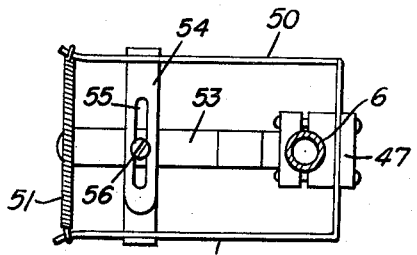
Robert E. Williams
Ellsworth C. Engel
INVENTORS

United States Patent Office 2,782,048
Patented Feb. 19, 1957

2,782,048

GOLF BAG CART

Robert E. Williams and Ellsworth C. Engel, Muskegon, Mich.

Application September 22, 1952, Serial No. 310,811

3 Claims. (Cl. 280—42)

The present invention relates to new and useful improvements in golf bag carts and more particularly to a collapsible cart.

An important object of the invention is to provide collapsible legs for the wheels of the cart and a collapsible handle having means connecting the handle to the legs for moving the latter into and out of collapsing position upon a corresponding movement of the former.

Another object is to provide laterally swingable as well as forwardly and rearwardly swingable legs for collapsing against a bag supporting post and wherein the bag is supported in an inclined substantially balanced position on the legs to relieve the handle of the weight of the bag when the cart is in a carrying position.

A further object is to provide a device of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1 is a side elevational view showing the cart in carrying position;

Figure 2 is an enlarged fragmentary rear elevational view showing the cart in bag carrying position;

Figure 3 is a side elevational view showing the cart in collapsed position;

Figure 4 is an enlarged fragmentary rear elevational view of the cart in collapsed position;

Figure 5 is an enlarged fragmentary vertical sectional view taken on the line 5—5 of Figure 2;

Figure 6 is a vertical sectional view taken on the line 6—6 of Figure 5;

Figure 7 is a transverse sectional view showing the lower adjustable bag support and taken on the line 7—7 of Figure 1;

Figure 8 is an enlarged sectional view of one of the wheel mountings taken on the line 8—8 of Figure 2;

Figure 9 is an enlarged perspective view of the sliding connector between the handle and legs;

Figure 10 is an enlarged group perspective view of the clamp for the upper bag holder, and Figure 11 is an enlarged fragmentary perspective view of the adjustable clevis for the brace rod of the wheel mounting.

Referring now to the drawings in detail, wherein for the purpose of illustration we have disclosed a preferred embodiment of our invention, the numeral 5 designates an upper bag supporting post and the numeral 6 is a lower bag supporting post connected to each other in vertical alignment by means of a central casting 7.

Casting 7 comprises a plate 8 having rearwardly projecting apertured ears 9 at its upper side edges in which a pin 10 is supported in a transverse position back of the plate. A pair of apertured ears 11 also project rearwardly from the lower side edges of the plate 8 and in which individual pivoted pins 12 are supported and with the pins projecting outwardly beyond the side edges of the plate 8.

A connector or leg supporting plate 13 is formed with a pair of apertured ears 15 at its upper edge for pivotally mounting on the pin 10 for forward and rearward swinging movement behind the plate 8. A pair of legs 14 are pivotally mounted at their upper ends on pins 14a carried at the upper portion of plate 13 for inward and outward swinging movement of the legs. Stops 16 at the upper side edges of plate 13 limit outward swinging movement of the legs.

The lower ends of legs 14 project into a recess 17 in the upper surface of wheel mountings 18 and the legs are pivoted thereto by means of pins 19. The wheel mountings 18 are formed with stub axles 20 on which the wheels 21 are rotatably mounted.

Brace rods 22 are also pivoted at their lower ends in recess 17 of the wheel mountings 18 forwardly of legs 14 by means of pins 23 and the upper ends of the brace rods 22 are pivotally connected to the outer ends of pins 12 by means of adjustable clevices 24.

Caster adjusting rods 25 for wheels 21 are also pivoted at their lower ends on pins 26 in the recess 17 of wheel mountings 18 laterally inwardly with respect to legs 14 and extend upwardly from the wheel mountings in inwardly inclined relation with respect to the adjacent legs and the caster adjusting rods 25 are pivoted at their upper ends to the opposite sides of a guide block 27 by means of pins 28. Guide block 27 is cast on the rear surface of plate 13 and between the upper ends of legs 14, as shown to advantage in Figures 5 and 6 of the drawings.

Guide block 27 is formed with a vertical bore 29 in which a pin 30 is vertically slidable and pairs of spreader links 31 are pivoted at their inner ends by pins 31a to the outer ends of a T-shaped base 32 at the lower portion of pin 30, while the outer ends of the links are pivoted by pins 31b to the respective legs 14.

A vertical rod 33 is pivoted by a pin 33a to the rearwardly projecting end of base 32 and the upper end of rod 33 is pivoted as at 33b to a lug 34 projecting rearwardly from a socket 35 in which the handle 36 is suitably secured.

Socket 35 is formed with spaced apart apertured ears 37 which are pivotally mounted on a thumb screw 38 carried by a clamp 39 which is secured to the upper end portion of upper post 5.

An upper golf bag holder 40 is constructed of a pair of L-shaped members 41, 42 with one end portion 43 of member 41 and one end portion 44 of member 42 secured parallel to each other and adjustable inwardly and outwardly by a clamping plate 45 secured to clamping member 39. The free end portions of the L-shaped members 41, 42 project forwardly with respect to post 5 and a coil spring 46 has its ends connected to the front end portions of the members 41 and 42 to extend transversely across the front of a golf bag B placed in the upper holder 40.

A clamping member 47 is also secured to the lower end portion of lower post 6 and to which a lower golf bag holder 48 is secured and likewise constructed of a pair of L-shaped members 49 and 50 secured to the lower clamping member 47 in the same manner as heretofore described with respect to upper golf bag holder 40. A coil spring 51 likewise has its ends connected to the front end portions of the L-shaped members 49 and 50 to extend transversely in front of the lower portion of the golf bag 46 and the lower end of the golf bag rests on a rack 52 which includes a forwardly projecting arm 53 secured to the lower portion of the clamping member 47 and a pair of L-shaped side members 54 which have their upper ends welded or otherwise suitably secured to the members 49 and 50 and with the other end portions of the members 54 positioned in overlapping relation with respect to each other and formed with aligned slots 55 which are adjustably secured to the arm 53 by a screw or other fastener 56.

In the operation of the device, an upward swinging movement of handle 36 from the collapsed position shown in Figure 3 will pull rod 33 upwardly and since the upper end of rod 33 is pivoted to the handle at a point 33b offset from the handle pivot, the rod 33 will swing rearwardly and pull connector 13 in a similar direction to also swing legs 14 and the caster adjusting rods rearwardly. The upward movement of rod 33 will also slide pin 30 upwardly in guide block 27 causing the links 31 to swing upwardly and to swing legs 14 outwardly. Brace rods 22 swing rearwardly and outwardly by the wheel mountings 18 and as the mountings move outwardly or away from each other from the position shown in Figures 3 and 4 to the position shown in Figures 1 and 2, the wheel mountings will swing the brace rods 22 rearwardly and outwardly to brace the wheels with the post 6.

In order to open the cart from its collapsed position, as shown in Fig. 3, into its bag carrying position, as shown in Fig. 1, the cart is tilted forwardly to rest on the lower bag holder 48 and to relieve the wheels 21 of the weight of the cart. Handle 36 may then swing upwardly to pull rod 33 upwardly and also pull the links 31 upwardly to spread the legs 14 and swing the wheels outwardly, as set forth above. The inner ends of the links 30 ride upwardly with plunger 30 which provides the movement necessary for the handle to be raised from its lower collapsed position parallel to the posts 5 and 6 to its upper rearwardly inclined position.

As the legs 14 swing outwardly in their spreading movement, the rods 22 are also subjected to a corresponding movement, but because these rods are shorter than the legs and are pivoted at their upper ends at a point below the pivot for the legs, the rods tend to swing the wheels rearwardly on the pivot 10 to a rearwardly inclined position to thus support the golf bag in a rearwardly tilted position on the wheels.

Golf carts are usually pulled by the handle in a trailing position and accordingly the rods 22 serve the added function of bracing the wheels against shock when striking obstructions.

Also as the legs 14 and wheels 21 swing outwardly the caster of the wheels is adjusted by the rods 25 which are connected to the wheel mountings 18 inwardly of the legs 14 to thus cause a tilting of the wheel mountings and the wheels.

The upper and lower golf bag holders 40 and 48 may be adjusted as to width to accommodate bags of different sizes and the bag may be held in the holders when the cart is either in its collapsed or in its carrying position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A collapsible golf cart comprising a vertical golf bag support, a transverse pivot member carried by the support, a connector pivoted at its upper portion to said pivot member rearwardly of the support for forward and rearward swinging movement of the connector relative to the support, a pair of rearwardly projecting pivot members at the rear upper portion of the connector, a pair of legs pivoted at their upper ends to said last named pivot members for lateral inward and outward movement of the legs and said legs being swingable forwardly and rearwardly with a corresponding movement of the connector, a pair of wheel mountings, wheels journaled on the mountings, inner, outer and intermediate pivot members carried by the wheel mountings in a position transversely with respect to the axis of the wheels, means pivotally connecting the lower ends of the legs to the outer pivot members of said wheel mountings, a foldable handle pivoted to the upper portion of the support, a vertically movable connecting rod pivoted at one end portion to the handle and extending downwardly therefrom, means pivotally and slidably connecting the lower end of the connecting rod to the connector, a pair of spreader links having outer end portions pivoted to the respective legs and said links being pivoted at their inner ends to the lower portion of the connecting rod, said links swinging the legs inwardly and outwardly by a raising and lowering movement of the handle and connecting rod, a pair of vertical brace rods pivoted at their lower ends to the inner pivot members of the wheel mountings, swivel means carried by the support, said brace rods being secured at their upper ends to said swivel means, a pair of vertical wheel caster adjusting rods, means pivotally connecting the lower ends of the last named rods to the intermediate pivots of the wheel mountings, a pair of rearwardly extending pivot members carried by the lower central portion of the connector, said last named rods being pivoted at their upper ends to said last named pivot members, said handle swingably actuating the connector forwardly and rearwardly to swing said legs, said brace rods and said caster adjusting rods inwardly and outwardly at the sides of the support as well as forwardly and rearwardly at the rear of the support by the raising and lowering of the handle.

2. A collapsible golf cart comprising a vertical golf bag support having a transverse pivot, a connector pivoted at its upper portion to said pivot for forward and rearward swinging movement of the connector relative to the support, a pair of rearwardly projecting pivot members at the rear upper portion of the connector, a pair of legs pivoted at their upper ends to the last named pivot members for lateral inward and outward movement of the legs and said legs being swingable forwardly and rearwardly with a corresponding movement of the connector, a pair of wheel mountings, a wheel journaled on each of said mountings, pivot means comprising inner, outer and intermediate pivot members carried by the wheel mountings in a position transversely with respect to the axis of the wheels, means pivotally connecting the lower ends of the legs to the outer pivot members of said wheel mountings, a foldable handle pivoted to the upper portion of the support, elongated foldable spreader means for each leg and including an end portion pivotally connected to a corresponding leg, means connecting the handle to the other end portions of the spreader means for actuation of the latter by the handle, said last named means including a substantially vertical connecting rod pivoted at its upper end to the handle and pivotally and slidably connected at its lower end to said connector, a pair of vertical brace rods pivoted at their lower ends to the inner pivot members of the wheel mountings, swivel means carried by the support, said brace rods being secured at their upper ends to said swivel means, a pair of vertical wheel caster adjusting rods, means pivotally connecting the lower ends of the last named rods to the intermediate pivots of the wheels mountings, a pair of rearwardly extending pivot members carried by the lower central portion of the connector, said last named rods being pivoted at their upper ends to said last named pivot members, said handle swingably actuating the connector to swing said legs, said brace rods and said caster adjusting rods inwardly and outwardly of the sides of the support as well as forwardly and rearwardly at the rear of the support by the raising and lowering movement of the handles.

3. A collapsible golf cart comprising a vertical golf bag support, a transverse pivot member carried by the support, a connector pivoted at its upper portion to said pivot member rearwardly of the support for forward and rearward swinging movement of the connector relative to the support, a pair of rearwardly projecting pivot members at the rear upper portion of the connector, a pair of legs pivoted at their upper ends to said last named pivot member for lateral inward and outward movement of the legs and said legs being swingable forwardly and rearwardly with a corresponding movement of the connector, a pair of wheel mountings, wheels journaled on the mountings, inner, outer and intermediate pivot members carried by the wheel mountings in a position transversely with respect to the axis of the wheels, means pivotally connecting the lower ends of the legs to the outer pivot members of said wheel mountings, a foldable handle pivoted to the upper portion of the support, a vertical slide carried by the connector, means pivotally connecting the lower end of the handle to the slide, spreader means connecting the legs to the slide for actuating the former by the latter, a pair of vertical brace rods pivoted at their lower ends to the inner pivot members of the wheel mountings, swivel means carried by the support, said brace rods being secured at their upper ends to said swivel means, a pair of vertical wheel caster adjusting rods, means pivotally connecting the lower ends of the last named rods to the intermediate pivot of the wheel mountings, a pair of rearwardly extending pivot members carried by the lower central portion of the connector, said last named rods being pivoted at their upper ends to said last named pivot members, said handle slidably actuating the slide and swingably actuating the connector to swing said legs, said brace rods and said caster adjusting rods inwardly and outwardly at the sides of the support as well as forwardly and rearwardly at the rear of the support by the raising and lowering of the handle.

References Cited in the file of this patent
UNITED STATES PATENTS

| | | |
|---|---|---|
| 2,523,893 | Williamson | Sept. 26, 1950 |
| 2,556,814 | Love | June 12, 1951 |
| 2,574,232 | Welsh | Nov. 6, 1951 |
| 2,610,864 | Alexander | Sept. 16, 1952 |
| 2,626,814 | Chamberlin | Jan. 27, 1953 |
| 2,658,771 | Rutledge | Nov. 10, 1953 |